INVENTORS:
EUGENE W. BUTLER
JOE WILLIAMSON JR.
BY Gravely, Lieder & Woodruff
ATTORNEYS.

Jan. 21, 1964  E. W. BUTLER ETAL  3,118,835
COMPLETE OXIDATION SEWAGE TREATMENT PLANT
Filed Oct. 27, 1960  7 Sheets-Sheet 2

INVENTORS:
EUGENE W. BUTLER
JOE WILLIAMSON JR.
BY Gravely, Lieder & Woodruff
ATTORNEYS.

INVENTORS:
EUGENE W. BUTLER
JOE WILLIAMSON JR.
BY Gravely, Lieder & Woodruff
ATTORNEYS.

Jan. 21, 1964  E. W. BUTLER ETAL  3,118,835
COMPLETE OXIDATION SEWAGE TREATMENT PLANT
Filed Oct. 27, 1960  7 Sheets-Sheet 5

INVENTORS:
EUGENE W. BUTLER
JOE WILLIAMSON JR.
BY Gravely, Lieder & Woodruff
ATTORNEYS.

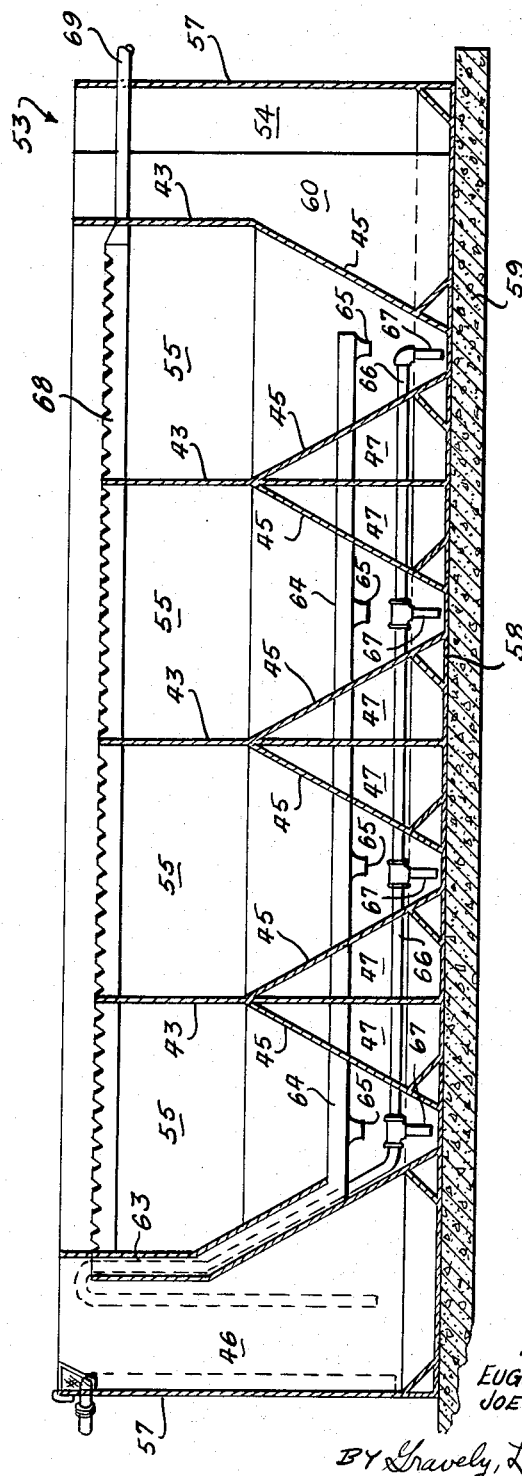

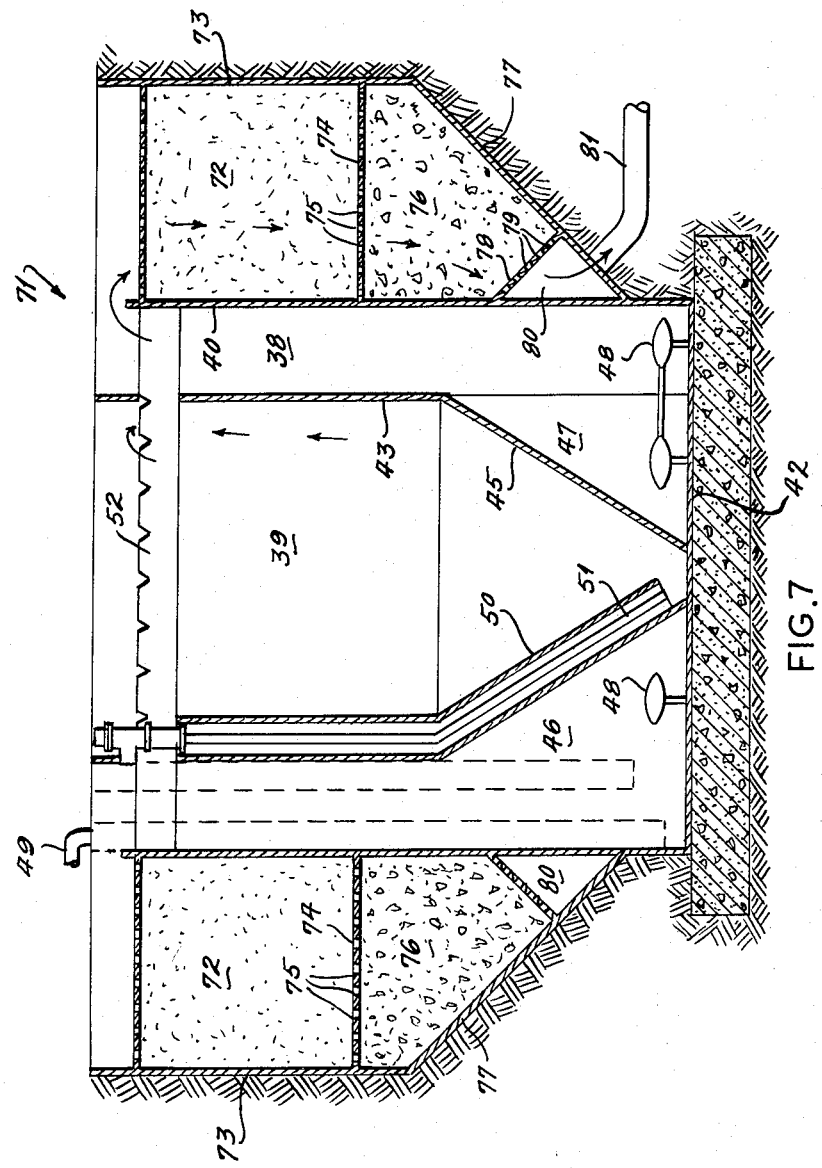

3,118,835
COMPLETE OXIDATION SEWAGE TREATMENT PLANT

Eugene W. Butler, 8515 Delmar Blvd., St. Louis County, Mo., and Joe Williamson, Jr., 6731 Manchester Ave., St. Louis, Mo.
Filed Oct. 27, 1960, Ser. No. 65,369
4 Claims. (Cl. 210—221)

This invention relates to a sewage treatment plant and particularly relates to an improved and simplified sewage treatment package of the complete oxidation type.

Present sewage treatment plants are usually either anaerobic or aerobic, the term anaerobic designating the absence of dissolved oxygen in the process and the term aerobic designating the presence of dissolved oxygen in the process.

The present invention relates to an aerobic process wherein air is added to the sewage to aid in its digestion and to impel it through the plant.

Present plants often are large and expensive to construct, usually consisting of one or more aeration chambers and clarification chambers. The sewage passes into the aeration chamber where it is held for a period of time after which it passes to the clarification chamber where it separates into a clear effluent and an undigested portion which is accumulated and recirculated through the process.

Present plants have the disadvantage of being large, permanent installations which are difficult to construct, and which must be built on site with none of the savings possible with modern prefabricated construction.

Present sewage plants have the further objectionable characteristic that the sewage being treated often forms a dead area or zone of noncirculation in the interior of the aeration chamber. The sewage enters the dead area and "short circuits" through the process, in a fashion such that it is not held in the plant for the time required for complete digestion, or else is not exposed to sufficient oxygen for complete digestion in the aerator. This undigested sewage enters the clarification chamber and disrupts the normal functioning of said chamber such that the raw sewage contaminates what should be clear and reasonably purified effluent. The extra undigested sewage overworks the capacity of the clarification chamber and results in uneconomical operation of the plant because too much undigested sludge must be recirculated through the process.

One of the principal objects of the present invention is to provide a sewage treatment plant wherein all of the sewage is retained in the process for a complete cycle. Another object is to provide a compact easily transportable sewage treatment plant package which is economical to operate and install and which can be prefabricated before being shipped to the installation site.

Still another object is to provide a sewage treatment process wherein all of the sewage is exposed to oxygen for an equal period of time sufficient to insure complete digestion of the solid material. Another object is to provide a sewage treatment apparatus with a retainer to catch undigestible solid matter in the sewage prior to its entering the clarification chamber.

Still another object is to provide a novel apparatus wherein a clarification chamber is positioned inside and spaced from an aeration chamber and wherein compressed air is utilized to tumble and break up the sewage in the aeration chamber during the digestion process, thereby uniformly exposing all of the sewage to oxygen for a standard period of time.

These and other objects and advantages will become apparent hereinafter.

The present invention comprises a sewage treatment plant having an aeration compartment effectively divided into sewage treating areas wherein the sewage is aerated and retained for an optimum period of time, and a clarification chamber to which the aerated sewage is passed and wherein it receives further processing. The invention further comprises the method and apparatus for treating sewage hereinafter described and claimed.

In the drawings wherein like numerals refer to like figures:

FIG. 6 is a side sectional view taken along line 6—6 of FIG. 5, and

FIG. 7 is a side sectional view of a further modification of the present invention.

Figure 1:
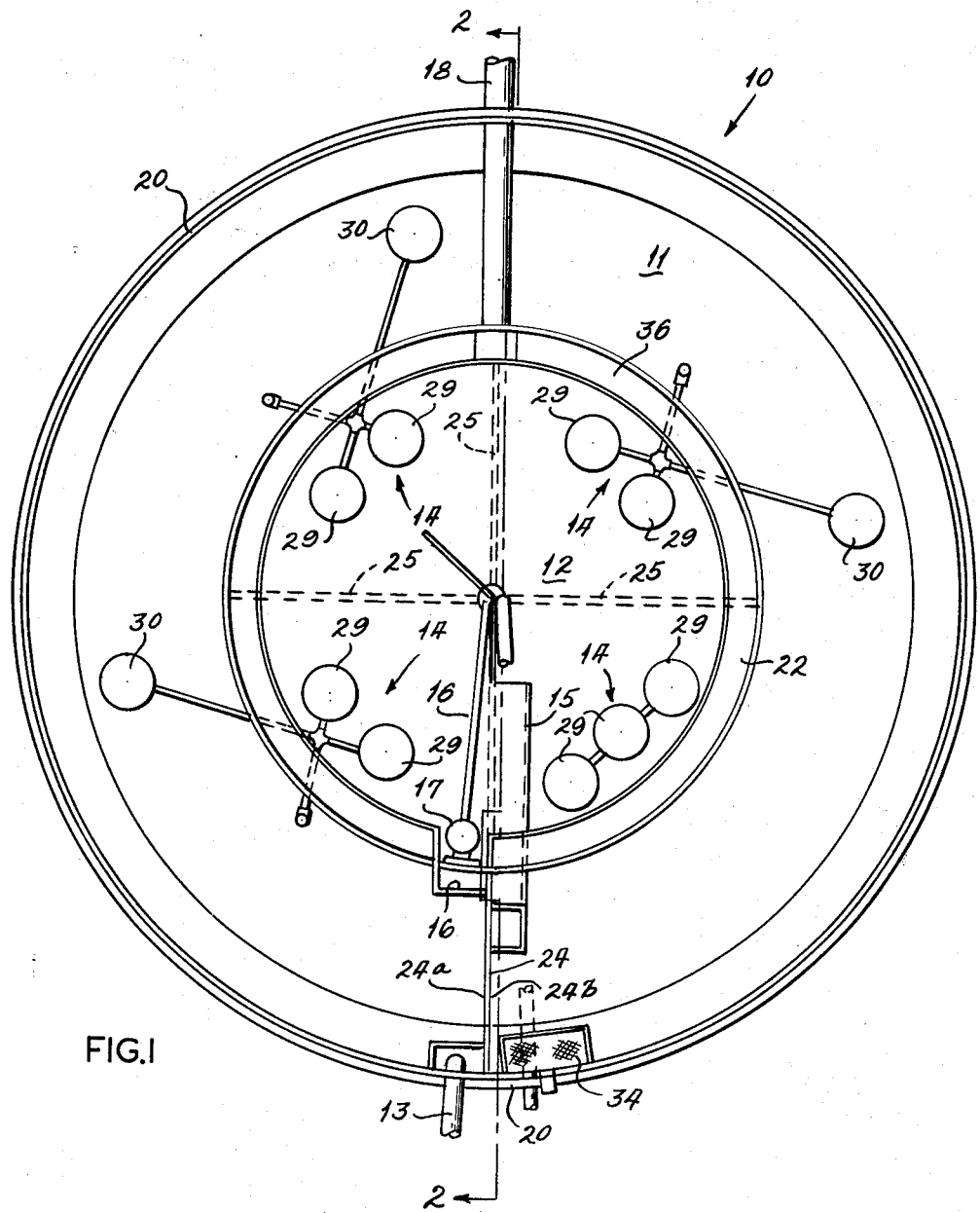
FIG. 1 is a top plan view of a sewage treatment plant.
Figure 2:
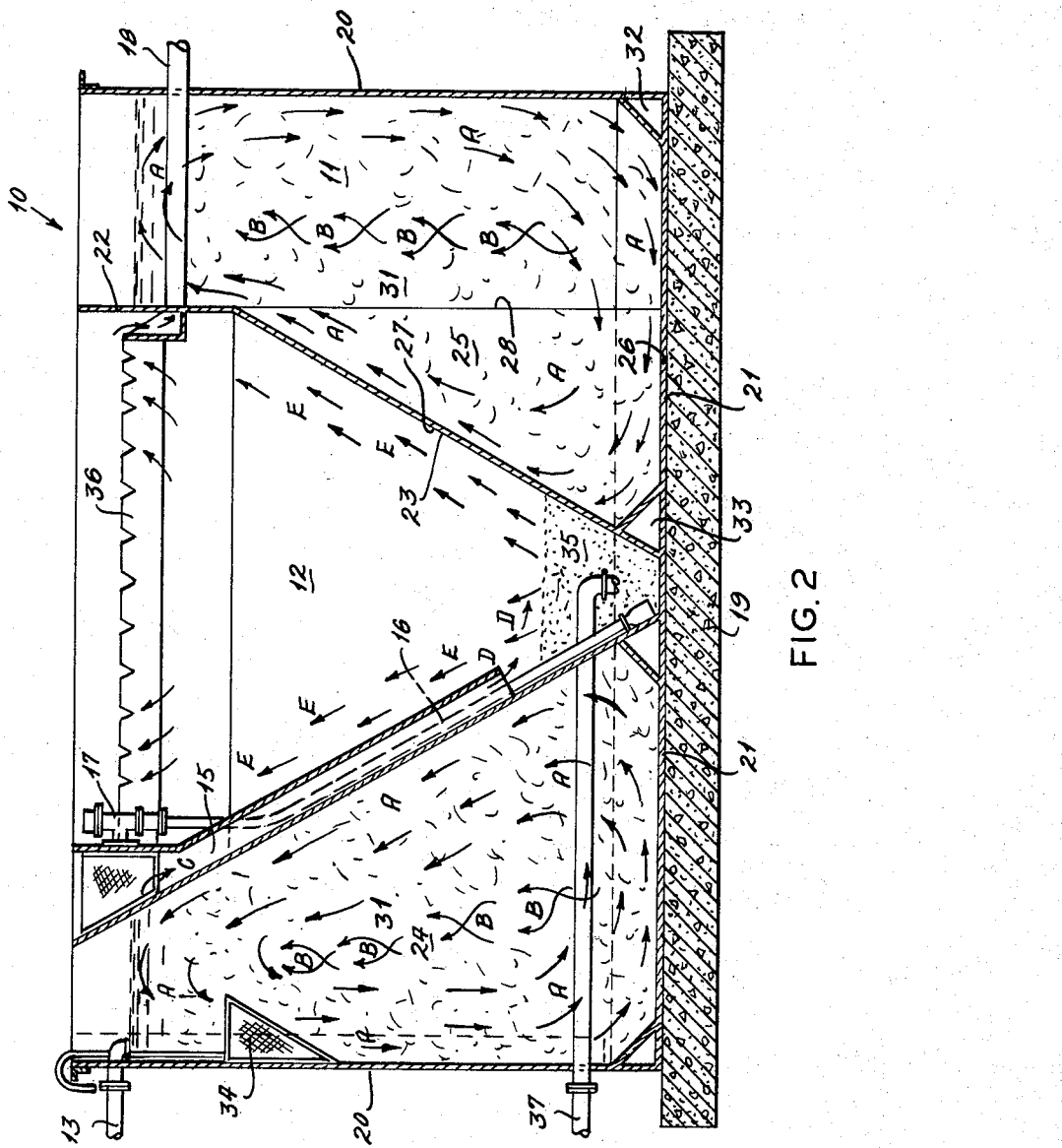
FIG. 2 is a side sectional view taken along line 2—2 of FIG. 1.

In the drawings, FIGS. 1 and 2 show a sewage treatment plant 10 including an aeration chamber 11, a clarification chamber 12, a sewage inlet 13 to the aeration chamber 11, aerators 14, a conduit 15 carrying partially treated sewage from the aeration chamber 11 to the lower portion of the clarification chamber 12, a conduit 16 connecting the clarification chamber 12 and the aeration chamber 11 including pump means 17 whereby undigested sewage is recirculated from the clarification chamber 12 to the aeration chamber 11, and a conduit 18 by which completely treated sewage or effluent is passed from the plant 10. The plant 10 is positioned atop a permanently located base 19 which preferably is concrete.

The aeration chamber 11 includes a cylindrical outer wall 20 and a base wall 21 which also forms a common base for the clarification chamber 12. The inner wall of the aeration chamber 11 defines the clarification chamber 12 and includes a generally cylindrical top portion 22 and a truncated conical lower portion 23.

A main baffle wall 24 is positioned in the aeration chamber 11 between the outer wall 20 and both the cylindrical portion 22 and the conical portion 23 of the inner wall, and effectively separates the aeration chamber 11 to form both the starting and end points in the aeration portion of the sewage treatment process. The sewage enters on a first side 24a of the wall 24 at the sewage inlet 13 and is processed around the aeration chamber 11 by the aerators 14 (as will be explained more fully hereinafter) until it reaches the second side 24b of the main baffle wall 24 where it passes to the clarification chamber 12 through the line 15.

Baffle plates 25 are positioned in the aeration chamber 11 between the bottom wall 21 and the truncated conical portion 23 of the inner wall. The baffles 25 are generally of triangular shape having a base edge 26 positioned against the base wall 21, an elongated margin 27 positioned against the inner wall portion 23 and a free margin 28 forming a continuation of the inner wall cylindrical portion 22.

The baffle plates 25 are critical to the present invention, because they effectively divide the aeration chamber 11 into four quadrants and retain the sewage in each quadrant for its full treatment time. Thus each particle of sewage stays in the aeration chamber, where the most important digestion takes place, for a full cycle (generally about 24 hours).

If the baffle plates 25 are not situated as described, the sewage would "short circuit" from the sewage inlet 13 around the apex of the conical portion 23 of the clarification chamber 12 and thereby effectively by-pass the aeration cycle in the aeration chamber 11. The baffles 25 prevent this and insure that all of the sewage gets adequate treatment before it enters the clarification chamber 12. If raw sewage should enter the clarification chamber 12, it would overtax the capacity of the chamber 12 and have to be recycled, which is inefficient and wasteful, or it would pass out with the effluent through the line 18 and contaminate the drainage field and possibly be a health and safety hazard to the community.

Each aerator system 14, except that in the quadrant adjacent the baffle wall side 24b, includes a bank of aerators 29 positioned in the space defined by adjacent baffle plates 25 and otherwise bounded by walls 21 and 23, and an individual aerator 30 positioned adjacent to the base wall 21 at the outer wall 20. All of the aerators 29 and 30 emit compressed air provided by a main air compressor (not shown). The aerators 29 tend to rotate the sewage in a tumbling motion from the base 21 up along the inner walls 23 and 22 and down the outer wall 20 (arrows A in FIG. 2). The aerators 29 also impel the sewage around the aeration chamber 11 from the inlet 13 to the conduit 15 leading to the clarification chamber 12.

The aerators 30 positioned near the outer periphery of the aeration chamber 11 tend to break up the mass or core of sewage 31 which tends to form in the center of the tumbling action (arrows A) induced by the inwardly positioned aerators 29. This solid core 31 can be likened to a doughnut with the hole of the doughnut being the clarification chamber 12. The action of the aerators 30 breaks up the core 31 as shown by the arrows B in FIG. 2. All of the aerators 29 are positioned beneath the clarification chamber wall 23 in the quadrant nearest the baffle wall side 24b, because there is no danger of a core forming and a tumbling action is desired to throw the solid matter to the outer periphery of aeration chamber where it is removed by the container 34 as hereinafter described. Thus, all of the sewage in the aeration chamber 11 is exposed to the action of the compressed air and the digestion process is enhanced. Instead of compressed air, other forms of aeration, such as liquid air, liquid oxygen, etc. could be used.

The conical walls 23 also tend to give a good tumbling motion to the sewage. The walls are inclined at about 60° to the horizontal to give the maximum exposure time to the oxygen and the best tumbling action, while allowing the undigested sewage to fall to the bottom of the clarification chamber 12.

Fillets 32 and 33 are positioned in the clarification chamber 12 on the base wall 21 where it intersects the outer wall 20 and inner wall 23, respectively, to prevent solid sewage from collecting in these spaces.

After the treated sewage has passed through and has been retained for about 6 hours in each of the quadrants of the aeration chamber 11, it passes into the mouth of the conduit 15 (arrows C in FIG. 2), passes through condiut 15 and is introduced into the clarification chamber 12 near the bottom thereof (arrows D in FIG. 2).

Any undigestible solid matter which is carried by the tumbling stream of sewage is removed by a receptacle such as a mesh basket 34 positioned on the aeration chamber outer wall 20 where it intersects the main baffle wall side 24b. All of the heavy matter in the sewage eventually passes through the basket 34 and is retained therein, because the heavier particles tend to go to the outer periphery of the tumbling stream. Since all of the aerators 24 in this quadrant are positioned toward and beneath the clarification chamber wall 23, the sewage is rotated without being stirred or agitated and the undigestible matter stays near the outer periphery of the aeration chamber 11 where it can pass through the basket 34.

The aerated sewage remains in the clarification chamber 12 for about 8 hours, while the undigested matter 35 settles to the bottom and the clear effluent rises to the top (arrows E in FIG. 2). The undigested matter 35 is picked up in the return line 16 by the air lift pump 17 and reintroduced into the cycle with the new entering sewage at the main baffle wall side 24a, from whence it is recirculated through the plant 10 as hereinbefore described.

The clear effluent passes into a weir 36 around the top of the clarification chamber 12 and is passed out of the plant 10 through the effluent conduit 18 to an absorption bed or to a stream, etc.

An emergency sludge blowoff 37 has an open end positioned in the solid matter deposit 35 at the bottom of the clarification chamber 12 and leads to a suitable receptacle (not shown). The blowoff 37 is used only as a safety measure, if the system becomes overloaded or breaks down in some manner.

Figure 3:
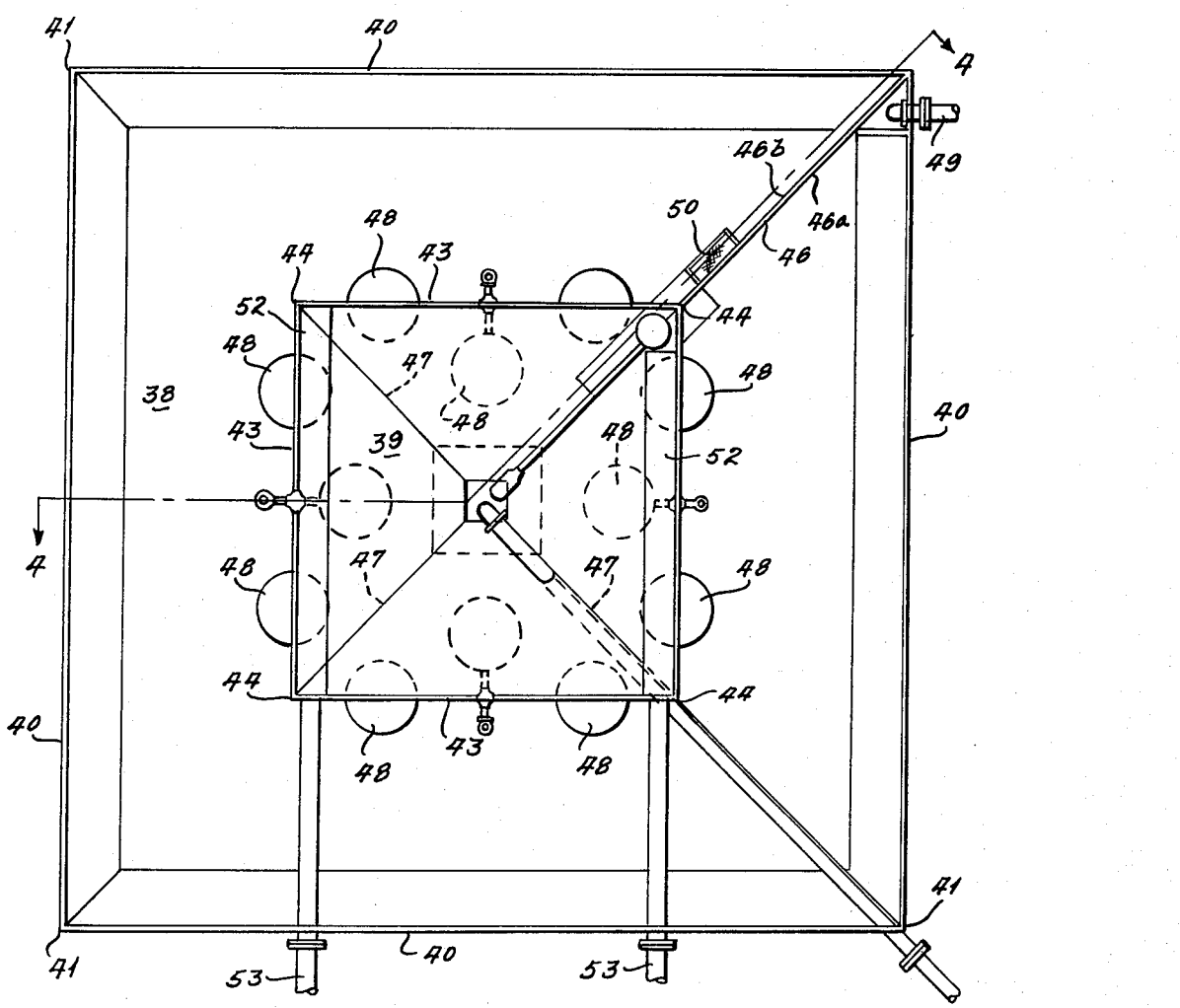
FIG. 3 is a top plan view of a modification of the present invention.
Figure 4:
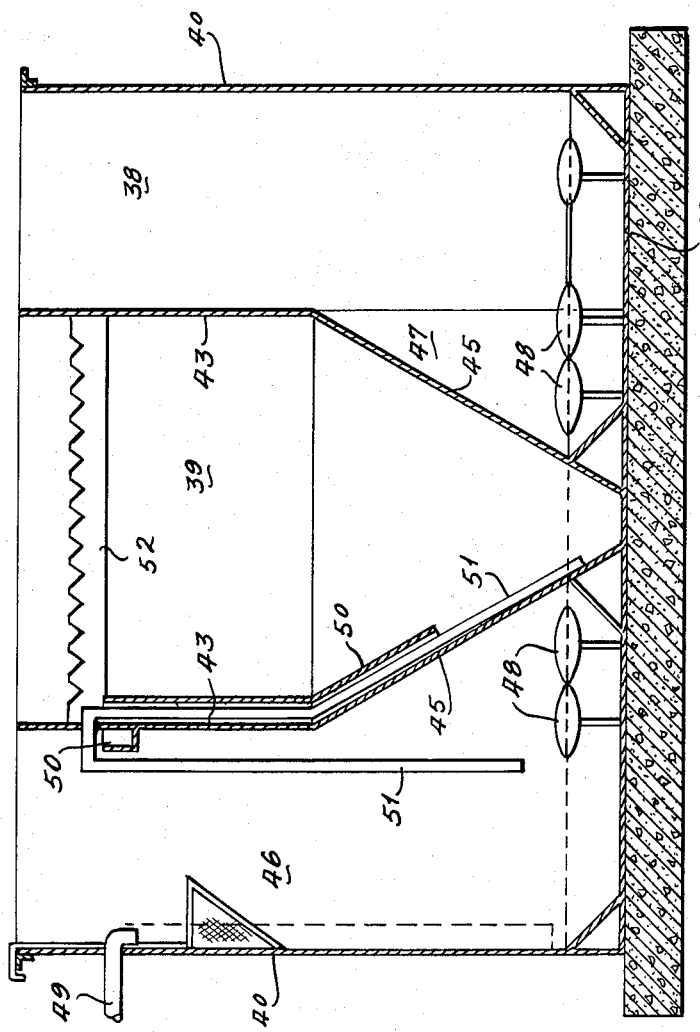
FIG. 4 is a side sectional view taken along line 4—4 of FIG. 3.

A modification of the present invention is shown in FIGS. 3 and 4, wherein the aeration chamber 38 is rectangular and the clarification chamber 39 is a truncated pyramid. The principle of operation of this modification is the same as that shown in FIGS. 1 and 2 and the component parts are generally similar.

The aeration chamber 38 consists of outer side walls 40 joined at their edges 41 and a base 42 which also is a common bottom for the clarification chamber 39. Besides the base 42, the clarification chamber 39 forms the inner wall of the aeration chamber 38 and includes an upper rectangular portion having side walls 43 joined at edges 44 and a lower truncated pyramidal portion having side walls 45 converging toward and intersecting the base 42. The walls 45 join each other in a continuation of the edges 44.

A main baffle wall 46 is positioned in the aeration chamber 38 between outer walls 40 and the inner walls 43 and 45 and joined to the edges 41 and 44. Baffle plates 47 are positioned in the aeration chamber 38 beneath the truncated pyramidal portion of the clarification chamber 39 at the edges 44. The baffles 47 divide the aeration chamber 38 into four quadrants and prevent short circuiting of sewage through the process around the apex of the clarification chamber 39.

Aerators 48 are positioned in the aeration chamber 38 in each quadrant beneath the clarification chamber walls. A sewage inlet 49 delivers raw sewage to the aeration chamber 38 along a first side 46a of the main baffle wall 46, from whence it is impelled with a tumbling rotary motion around the aeration chamber 38 to a second side 46b of the baffle wall 46 where it is taken into a conduit 50 having a screened opening, which delivers the aerated sewage to the lower portion of the clarification chamber 39.

A mesh basket 34a is positioned in the aeration chamber 38 adjacent to the wall 40 at the conduit 50 to retain undigestible matter before it can enter the clarification chamber through the conduit 50.

In the clarification chamber 39, the aerated sewage separates and the undigested solids fall to the bottom where they are picked up in a recirculating pipe 51 which carries the solid matter back to the starting point in the aeration cycle adjacent baffle wall side 46a. The clear effluent rises to the top of the clarification chamber 39 where it passes into a weir 52 and thence into an outlet pipe 53 by which it is carried out of the plant to a suitable place for disposal.

This modification has certain advantages in some situations and has the further advantage of being formed of flat sheets which can be readily assembled either at the site or in a plant and easily transported to the site. There are other advantages to the rectangular shape which will become apparent in connection with the structure shown in FIGS. 5 and 6, and explained more fully hereinafter.

Figure 5:
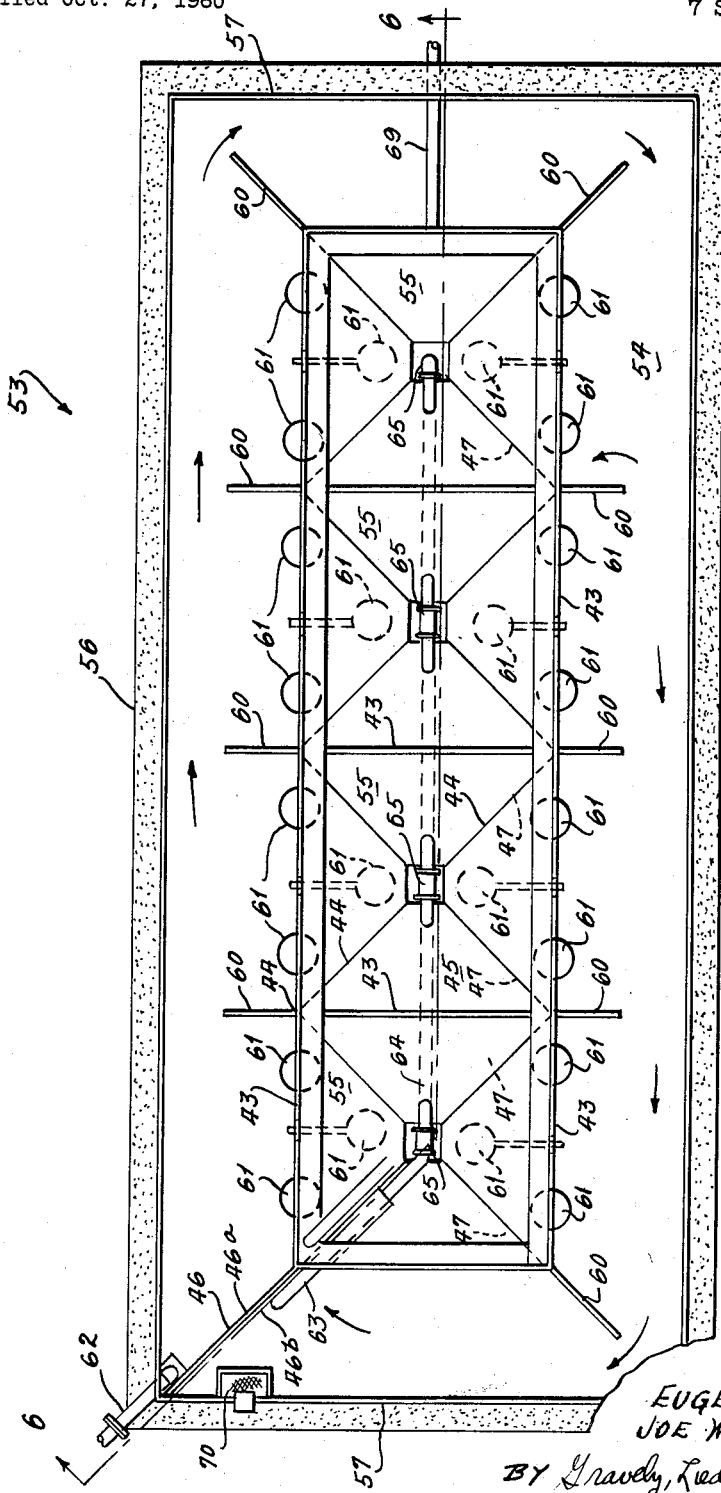
FIG. 5 is a top plan view of a further modification of the present invention.

FIGS. 5 and 6 show an enlarged plant 53 including an elongated rectangular aeration chamber 54 and a series of clarification chambers 55 arranged inside the aeration chamber 54.

The aeration chamber 54 includes elongated sides 56, end walls 57 and a bottom wall 58 fixed to a permanent base 59. Each of the clarification chambers 55 is similar to the clarification chamber 39 shown in FIGS. 3 and 4, and includes a rectangular upper portion having side walls 43 joined at the edges 44, and a lower truncated pyramidal portion having converging side walls 45 joined in continuations of the edges 44.

Baffle plates 47 are fitted between the base 58 and the edges 44 beneath the walls 45. A main baffle wall 46 divides the aeration chamber 54. Fitted to the base 58 at the point where the baffle plates 47 of each adjoining clarification chamber 55 meet, are extension baffle members 60 which extend into the aeration chamber 54 beyond the outer periphery of the clarification chambers 55 defined by the walls 43. The baffle extensions 60 divide the aeration chamber 54 into aerating spaces which hold the sewage for a predetermined treatment period.

Aerators 61 are located near the aeration chamber base wall 58 to impel the sewage from a sewage inlet 62 at a first side 46a of the baffle wall 46 around the aeration chamber 54 in a rolling and tumbling motion to a screened outlet 63 at a second side 46b of the wall 46. The aerated sewage is deposited in each clarification chamber 55 from a sewage conduit 64 communicating with the outlet 63 and having an outlet 65 in each clarification chamber 55.

The solid undigested sewage settles to the bottom of each clarification chamber 55 where it is picked up in a recirculating line 66 having inlets 67 in each chamber 55 and returned to the inlet side 46a of the main baffle wall 46, from which it is recycled through the plant 53.

The clear effluent passes upward in the clarification chambers 55 into weirs 68 and thence into an outlet 69 by which is removed from the plant 53. A screened receptacle 70 is positioned on the aeration chamber end wall 57 adjacent to the second side 46b of the baffle 46 to catch and remove undigestible solid matter from the sewage before it enters the clarification chamber 55.

The form of the invention shown in FIGS. 5 and 6 has the advantage of greater capacity per unit area. Furthermore, the units can be prefabricated and only the piping and other miscellaneous installation need be done on the site. This is extremely saving of time, labor, etc.

A further modification of this invention is shown in FIG. 7, wherein a complete home sewage treatment package is shown. The sewage treatment plant 71 includes an aeration chamber 38 and a clarification chamber 39 similar to those shown in FIGS. 3 and 4. The only difference in construction is in the treated sewage outlet. Instead of the clarified effluent passing from the plant 10 through an outlet pipe, it passes from the weir 52 into a chamber 72 filled with sand. The chamber 72 is defined by an outer wall 73 concentric with the aeration chamber 38, an inner wall which is the aeration chamber outer wall 40, and a bottom wall 74 having water passing perforations 75 therein. Positioned beneath the sand chamber 72 is a chamber 76 filled with gravel and defined by an outer wall 77, the aeration chamber outer wall 40, and a bottom wall 78 having perforations 79 therein. Beneath the gravel chamber 76 is a water collecting channel 80 fitted with an outlet pipe 81. The treated sewage passes from the sewage plane weir 52 through the sand chamber 72 and its perforated bottom 74, through the gravel chamber 76 and its perforated bottom 78, into the channel 80, and out through the outlet 81. The water is clear and purified and safe to exhaust into a street, stream or other inhabited area. Chlorine can be added to make it completely safe to drink. The structure shown in FIGS. 1 and 2 can also be used with the package shown in FIG. 7.

Thus it is seen that the present invention achieves all of the objects and advantages sought therefor.

This invention is intended to cover all changes and modifications of the examples of the invention herein chosen for purposes of the disclosure, which do not constitute departures from the spirit and scope of the invention.

What is claimed is:

1. A sewage treatment plant comprising an aeration chamber having a side wall and a bottom wall, a clarification chamber positioned within the aeration chamber and having a side wall spaced from the aeration chamber side wall and converging toward a bottom wall joined to the aeration chamber bottom wall, a main baffle wall positioned between the aeration chamber and the clarification chamber to completely divide the aeration chamber, a raw sewage inlet to the aeration chamber positioned adjacent to one side of said main baffle beginning the aerating cycle, baffle means positioned in the aeration chamber between the bottom wall thereof and the clarification chamber side wall and extending to the outer periphery of the clarification chamber to effectively divide the aeration chamber into aerating sections whereby the sewage is retained in the aeration chamber for a complete aeration cycle, passage means communicating the aeration chamber with the clarification chamber, said passage means being positioned on the other side of said main baffle wall at the end of the aeration cycle, aerators positioned in the aeration chamber to agitate and aerate the sewage in the aeration chamber, an effluent outlet communicating with the clarification chamber for discharging effluent from the system, and solids collection means positioned in the aeration chamber adjacent to the outer wall opposite the passageway communicating the aeration chamber with the clarification chamber to catch and retain solid materials in the sewage prior to its entering the clarification chamber.

2. A sewage treatment plant comprising an aeration chamber having a side wall and a bottom wall, a clarification chamber positioned within the aeration chamber and having a side wall spaced from the aeration chamber side wall and converging toward a bottom wall joined to the aeration chamber bottom wall, a main baffle wall positioned between the aeration chamber and the clarification chamber to divide the aeration chamber, a raw sewage inlet to the aeration chamber positioned on one side of said main baffle wall, baffle plates positioned between the outer surface of the converging portion of the clarification chamber and the bottom wall of the aeration chamber to effectively divide the aeration chamber into aerating sections whereby the sewage is retained in each aerating section for a predetermined period of time, passage means communicating the aeration chamber with the lower portion of the clarification chamber, said passage means being positioned at the end of the aeration cycle near the side of said main baffle wall opposite the side where the sewage inlet line is positioned, aerators positioned near the bottom of the aeration chamber beneath the converging walls of the clarification chamber to circulate the sewage around the aeration chamber in a tumbling manner, aerators positioned in the aeration chamber toward the outer periphery of the bottom wall to impart a twisting motion to the tumbling sewage to break up any solid core of stationary material located in the aeration chamber, a weir at the uppermost portion of the clarification chamber communicating with the clarification chamber to collect clear effluent from the system, an effluent outlet communicating with the weir, passage means communicating with the lowermost portion of the clarification chamber and the inlet side of the main baffle wall for recirculating undigested sewage through the system, an emergency sewage blowoff communicating the lowermost portion of the clarification chamber with the atmosphere, and a solids collection basket positioned adjacent to the aeration chamber outer wall opposite the passageway communicating the aeration chamber with the clarification chamber, said basket positioned beneath the fluid level of the aeration chamber to catch and retain undigestible materials thrown to the outside of the tumbling sewage prior to its entering the clarification chamber.

3. A sewage treatment plant comprising an elongated substantially rectangular aeration chamber, a series of connected substantially rectangular clarification chambers positioned within said aeration chamber and having converging lower portions, a main baffle wall positioned between said aeration chamber and one of said clarification chambers to effectively divide the aeration chamber, a raw sewage inlet to the aeration chamber positioned adjacent to one side of said baffle wall, secondary baffles positioned between the bottom wall of the aeration chamber and the converging portions of said clarification chambers to effectively divide the aeration chamber into segments, aerators in said aeration chamber positioned near the bottom wall thereof to aerate and to impel the sewage in a tumbling and twisting motion around the aeration chamber, passage means communicating the aeration chamber at the opposite side of the main baffle wall with the lower portions of each of the clarification chambers, solids recirculating passage means communicating the lowermost portions of the clarification chambers with the input side of the main baffle wall, an effluent weir positioned at the uppermost edges of the clarification chambers and communicating therewith, a clarified effluent outlet with said weir, and basket means positioned in the aeration chamber adjacent to an outer wall thereof near the second side of said main baffle wall and beneath the fluid surface of the aeration chamber to remove undigestible solids from the sewage prior to its entering the clarification chamber.

4. A sewage treatment plant comprising an aeration chamber having a side wall and a bottom wall, a clarification chamber positioned within the aeration chamber and having a side wall spaced from the aeration chamber side wall and converging toward a bottom wall joined to the aeration chamber bottom wall, a main baffle wall positioned between the aeration chamber and the clarification chamber to completely divide the aeration chamber, a raw sewage inlet to the aeration chamber positioned adjacent to one side of said main baffle beginning the aerating cycle, baffle means positioned in the aeration chamber between the bottom wall thereof and the clarification chamber side wall and extending to the outer periphery of the clarification chamber to effectively divide the aeration chamber into aerating sections whereby the sewage is retained in the aeration chamber for a complete aeration cycle, passage means communicating the aeration chamber with the clarification chamber, said passage means being positioned on the other side of said main baffle wall at the end of the aeration cycle, aerators positioned in the aeration chamber to agitate and aerate the sewage in the aeration chamber, and an effluent outlet communicating with the clarification chamber for discharging effluent from the system.

References Cited in the file of this patent

UNITED STATES PATENTS

| | | |
|---|---|---|
| Re. 22,652 | Reybold et al. | June 26, 1945 |
| 2,027,370 | Currie | Jan. 14, 1936 |
| 2,886,175 | Kalinske | May 12, 1959 |
| 2,901,114 | Smith et al. | Aug. 25, 1959 |
| 2,911,205 | Kraus | Nov. 3, 1959 |
| 2,987,186 | Burgoon et al. | June 6, 1961 |

FOREIGN PATENTS

| | | |
|---|---|---|
| 651,167 | Great Britain | Mar. 14, 1951 |